United States Patent
Kohli et al.

(10) Patent No.: US 8,705,860 B2
(45) Date of Patent: Apr. 22, 2014

(54) GROUPING VARIABLES FOR FAST IMAGE LABELING

(75) Inventors: Pushmeet Kohli, Cambridge (GB); Sebastian Reinhard Bernhard Nowozin, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 13/046,967

(22) Filed: Mar. 14, 2011

(65) Prior Publication Data

US 2012/0237127 A1    Sep. 20, 2012

(51) Int. Cl.
- *G06K 9/34* (2006.01)
- *G06K 9/62* (2006.01)
- *G06K 9/68* (2006.01)
- *G06K 9/70* (2006.01)

(52) U.S. Cl.
USPC .......... 382/173; 382/164; 382/180; 382/224; 382/226

(58) Field of Classification Search
CPC . G06T 7/0081; G06K 9/00664; G06K 9/6282
USPC ......................... 382/180, 224, 226
See application file for complete search history.

(56) References Cited

U.S. PATENT DOCUMENTS

| | | | |
|---|---|---|---|
| 6,968,342 B2 | 11/2005 | Wolman et al. | |
| 7,460,709 B2 | 12/2008 | Grady | |
| 7,587,099 B2 | 9/2009 | Szeliski et al. | |
| 7,676,081 B2 | 3/2010 | Blake et al. | |
| 7,706,610 B2 | 4/2010 | Zhang et al. | |
| 7,720,282 B2 | 5/2010 | Blake et al. | |
| 7,881,540 B2* | 2/2011 | Neemuchwala et al. | 382/225 |
| 2006/0291721 A1 | 12/2006 | Torr et al. | |
| 2011/0194762 A1* | 8/2011 | Haibing | 382/165 |
| 2012/0306904 A1* | 12/2012 | Francois et al. | 345/589 |
| 2013/0016879 A1* | 1/2013 | Baele et al. | 382/103 |

OTHER PUBLICATIONS

Kim et al., "Variable Grouping for Energy Minimization", IEEE Conference on Computer Vision and Pattern Recognition (CVPR), 2011, pp. 1913-1920.*

Boykov, "An Experimental Comparison of Min-Cut/Max-Flow Algorithms for Energy Minimization in Vision", IEEE Transactions on Pattern Analysis and Machine Intelligence, vol. 26, No. 9, Sep. 2004 retrieved at <<http://ieeexplore.ieee.org/stamp/stamp.jsp?tp=&arnumber=1316848>>, pp. 1124-1137.

(Continued)

*Primary Examiner* — Matthew Bella
*Assistant Examiner* — Jose M Torres
(74) *Attorney, Agent, or Firm* — Pablo Tapia; Jim Ross; Micky Minhas

(57) ABSTRACT

This application describes grouping variables together to minimize cost or time of performing computer vision analysis techniques on images. In one instance, the pixels of an image are represented by a lattice structure of nodes that are connected to each other by edges. The nodes are grouped or merged together based in part on the energy function associated with each edge that connects the nodes together. The energy function of the edge is based in part on the energy functions associated with each node. The energy functions of the node are based on the possible states in which the node may exist. The states of the node are representative of an object, image, or any other feature or classification that may be associated with the pixels in the image.

19 Claims, 8 Drawing Sheets

(56) References Cited

OTHER PUBLICATIONS

Boykov, "Fast Approximate Energy Minimization via Graph Cuts", IEEE Transactions on Pattern Analysis and Machine Intelligence, vol. 23, No. 11, Nov. 2001, retrieved at <<http://ieeexplore.ieee.org/stamp/stamp.jsp?tp=&arnumber=969114>>, pp. 1222-1239.

Boykov, et al., "Interactive Graph Cuts for Optimal Boundary & Region Segmentation of Objects in N-D Images," (c) 2001, IEEE, retrieved from <<http://ieeexplore.ieee.org/stamp/stamp.jsp?tp=&arnumber=937505>>, pp. 105-112.

\* cited by examiner

GROUPING VARIABLES FOR FAST IMAGE LABELING

BACKGROUND

Within the arena of computer vision, a number of powerful algorithms exist to solve large dataset problems that enable computer systems to analyze, interpret, and classify images. However, generating images with higher and higher resolution increases the amount of time to perform image segmentations, stereo matching, or image restorations. Previously, to reduce computational cost and increase speed, computer vision algorithms have merged image pixels into super-pixels based on color or appearance information associated with the pixels. These algorithms assume that pixels having similar color or appearance are likely to take the same label and can be merged into a super-pixel. This assumption can lead to a significant amount of mislabeling of individual pixels which result in inaccuracies in the image analysis techniques described above. Accordingly, a need remains for techniques that minimize processing time and increase the accuracy of image analysis techniques.

SUMMARY

This Summary is provided to introduce the simplified concepts for grouping or merging variables of a large dataset into groups of variables based upon an energy function associated with the variables. The application describes techniques that merge nodes or pixels based on the objective (or energy) function of the problem into groups of nodes in order to reduce the large problem into a smaller problem, such that the solution of the smaller problem may be used to provide an accurate solution for the larger problem. The larger problem is defined over larger number of variables (nodes) compared to the smaller problem.

The variables in the large problem are representative of an image that may be stored on a computer. The large problem may be represented by a lattice structure of nodes connected to each other by edges. Each node and edge of the lattice is associated with a potential function. The potential function for all nodes and edge when combined form the energy (or objective) function of the problem. The potential function of the nodes is based upon the possible states (or labels) of the node and the energy function of the edges is based upon the labels of the nodes that they connect. The potential functions defined over nodes and edges basically impose certain costs for the node to take a particular label, or in other words, to be in a particular state. The states of the nodes are a list of the potential or possible classifications of the nodes that may exist in the image. The energy functions of the nodes are based in part on the quantifiable possibilities in which state the node may exist. The nodes are labeled based upon the most likely preference or state of the node.

The merging of nodes may be dependent upon a computed weight of the edge that connects the two nodes. The weight may be represented by a variety of functions based upon the energy of the nodes and the edges. In one instance, the weight may be a function of an absolute difference between an energy potential of the first node and an energy potential of the second node. In that case, the nodes are merged based upon similarities of the energy potential, the energy potential being reprehensive of all states of each node. In another instance, the weight may be a function of a maximum difference in energy between the first node and the second node. In that case, the nodes are merged in view of the amount of disagreement between the states of each node. In a further instance, the weight may be a function of a difference between a mean energy of the nodes within a first set of states and a mean energy of the nodes in a second set of states. The first set of states comprises nodes in which the labels between the nodes are in agreement and the second set of states comprises nodes in which the labels between the nodes are in disagreement.

Following the merging of the nodes into a smaller dataset, the solution of the smaller problem may determined using energy minimization algorithms, such as Graph cuts, Belief propagation, or tree reweighted message passing, to compute the Maximum a Posteriori (MAP) solution. This solution, which is a labeling of the grouped nodes, is used to determine a labeling for the nodes of the larger problem. This can be done for instance by assigning each node in the larger problem with the label that was assigned to the group it belonged to in the small problem.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes, in part, systems and techniques for grouping variables of a large problem to form a smaller problem that may be solved to provide a solution that can be used to provide a solution for the large problem. To do so, the system may utilize multiple different techniques to merge the nodes and edges of the large problem. The techniques described above and below may be implemented in a number of ways and contexts. Several example implementations and contexts are provided with reference to the following figures, as described in more detail below. However, the following implementations and contexts are but a few of many.

Example Environment & Method

Figure 1A:
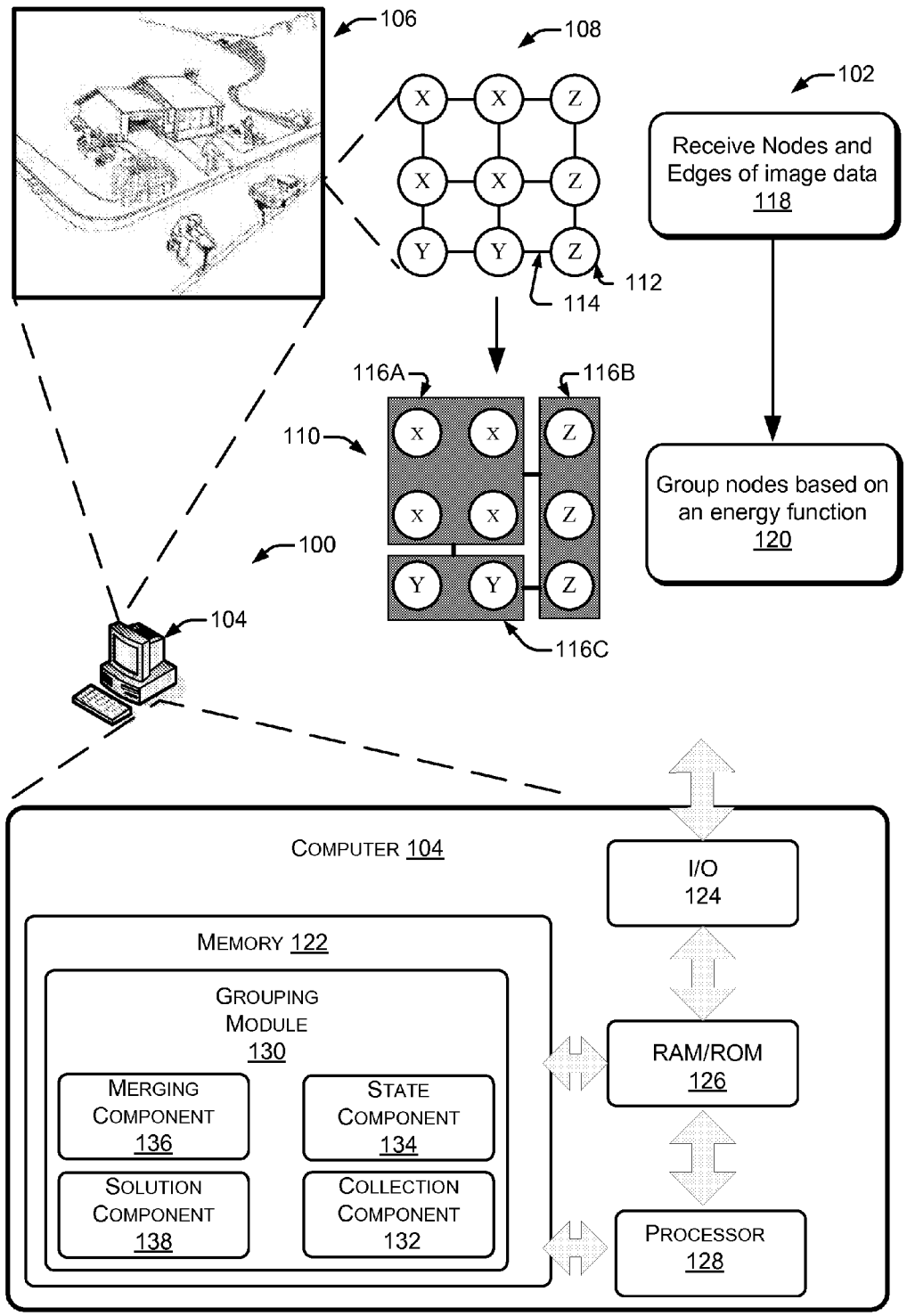
FIG. 1A illustrates an example environment and method in which a user operates a computing device to perform the method to analyze an image being modeled by a lattice of nodes and edges.

FIG. 1A illustrates an example environment 100 that may implement the described method 102. The example environment 100 may include a computer 104 and an image 106 stored on the computer 104.

The image 106 comprises a plurality of pixels that are represented by a lattice 108 of nodes (e.g., X, Y, Z or 112) and edges (e.g., 114). The lattice 108, as illustrated, is representative of an amount of pixels that may be included in the image 106. For example, the amount of pixels used to present the entire image 106 may exceed several million Hence, performing an analysis of such a large dataset may be time and cost prohibitive. Method 102 implements steps to reduce the large node-set to a smaller node-set to provide a more timely and less costly method to provide a solution for the larger dataset.

At block 118, the computer 104 receives the image 106 and the nodes (e.g., 112) and edges (e.g., 114) arranged in a lattice 108 via Input/Output 124 of the computer 104 that passes the information through the RAM/ROM 126 to store it in the collection component 132 of grouping module 130. Each received node includes a plurality of states, including a preferred state, and the energy functions for each node are based at least in part on the states of each node. Also, each edge 114 is provided with an energy function that is based upon the energy function of the nodes to which they are coupled. All of the state information and energy functions are provided to the state component 134 of grouping module 130. The details related to states, preferences, and energy functions for the nodes and edges are discussed in the description of FIG. 1B.

At block 120, the grouping module 130 uses the merging component 136 to group the nodes and edges into a plurality of merged nodes 110 based in part on the energy functions associated with the nodes. At a high level, the merged nodes (116A, 1116B, and 116C) include nodes (X, Y, or Z) which the merging component thinks will most probably take the same label in the solution of the large problem. Generally, the merging-component computes this probability using criteria based in part on a weight function for each edge that will be discussed in detail in the description of FIG. 2. Following the merging of the nodes, the solution component 138 implements the algorithms for solving MRF and CRF problems known in the art to compute a MAP solution that can be applied to the large problem represented by lattice 108. Additional details regarding this process will be discussed in the description of FIG. 2.

The instructions to perform method 102 are stored in the grouping module 130 in the memory 122 of computer 104. The instructions are executed by processor(s) 128 to perform method 102. The memory 122 and the RAM/ROM 126 may be comprised of any computer-readable media, Computer-readable media includes, at least, two types of computer-readable media, namely computer storage media and communications media. Computer readable media includes volatile and non-volatile, removable and non-removable media implemented in any method or technology for storage information such as computer readable instructions, data structures, program modules, program components, or other data. Computer storage media includes, but is not limited to, RAM, ROM, EEPROM, flash memory, or other memory technology, CD-ROM, digital versatile disks (DVD), other optical storage technology, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as carrier waves, or other transmission mechanisms. As defined herein, computer storage media does not include communication media.

Figure 1B:
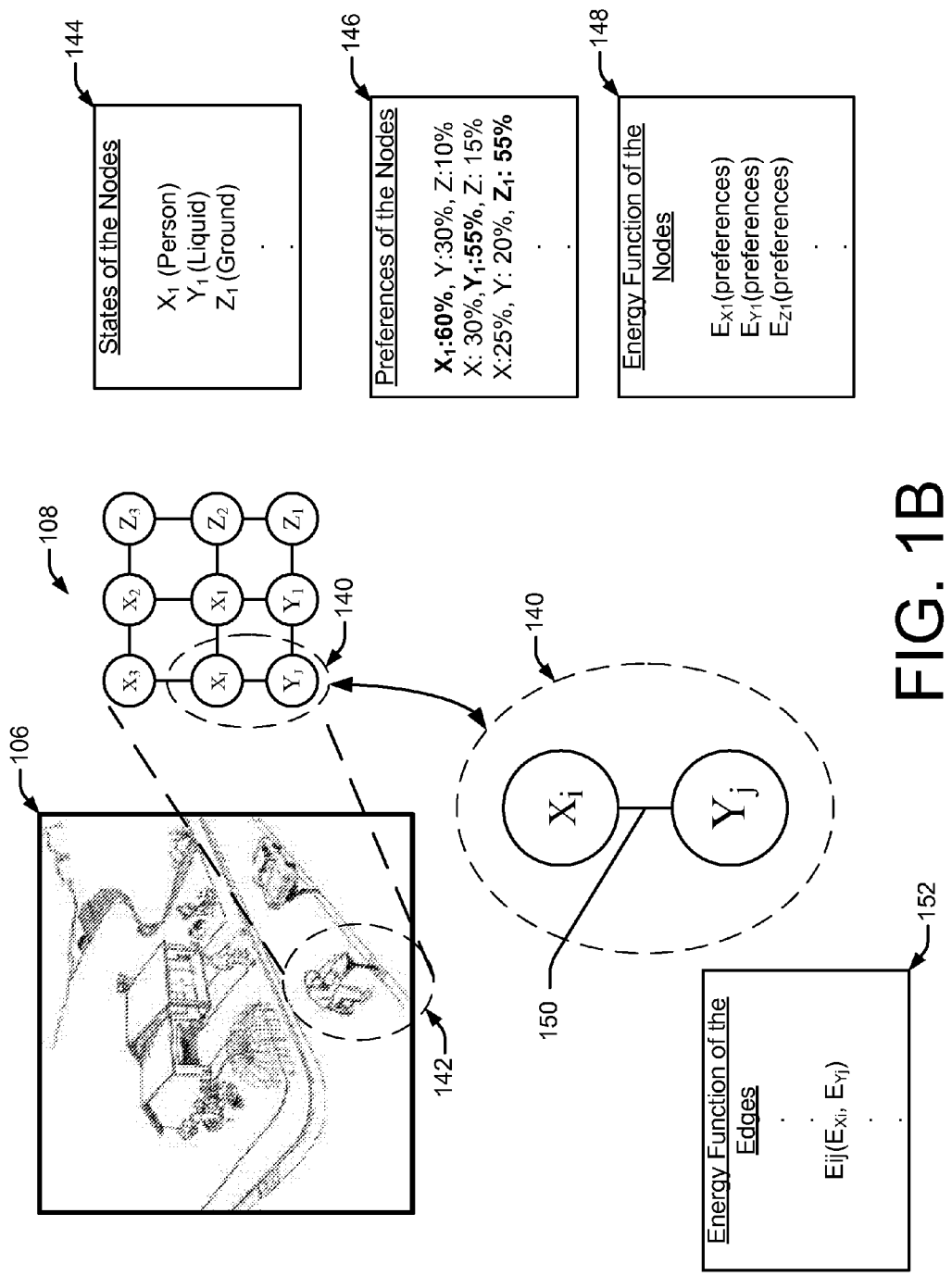
FIG. 1B illustrates the properties of the nodes and edges of the lattice.

FIG. 1B is an illustration of image 106, the lattice 108, an enlarged portion of the lattice 140, a highlighted portion of the image 142, and a plurality of tables (144-150) which are provided to clarify the concepts briefly described in FIG. 1A.

In this instance, lattice 108 includes nodes and edges that are representative of the pixels in the highlighted portion 142 of the image 106. The highlighted portion depicts a person kneeling in the street pour a liquid into a drain. Each node in lattice 108 includes a state (X, Y, or Z) that is associated in this highlighted portion 142. For ease of explanation, the states are related to object labels assigned to each pixel. Table 144 shows that the X nodes have been assigned states that are representative of the person, the Y nodes have been assigned states that are representative of the liquid, and the Z nodes have been assigned states that are representative of the ground. However, these states are not absolute, table 144 merely reflects the most likely or preferred state for that node. Table 146 lists the preferences or the likelihood that each node may be any one of the three states mentioned above. In this instance, $X_1$ is labeled as a person based on 60% likelihood, but may also be liquid (30%) or the ground (10%). Further, $Y_1$ is labeled as a liquid based on 55% likelihood, but also has a preference to be labeled a person (30%) or the ground (15%). $Z_1$ is also similarly characterized in table 146. The preferences are an important characteristic because they used to generate the energy function that is provided to state component 134. As is known in the art of optimization problems, the individual energy functions in table 148 are summed to reflect the energy of the image being modeled by the lattice 108. Hence, each node represents an energy component that when summed together may reflect the energy associated with an image.

Now turning to the use of energy functions in computer vision problems, most image and volume labeling problems in computer vision are formulated using probabilistic models such as MRF and CRF. In implementing these techniques any random field (denoted by X) is defined over a lattice V={1, 2, . . . , n} with a neighbourhood system. Each random variable $X_i \in X$ is associated with a lattice point $i \in V$ and takes a value from the label set L={$l_1, l_2, \ldots, l_k$}. For example, the label may be person, liquid, or ground as noted above. The neighborhood system E of the random field is a set of edges (i,j) which connect some random variables. For example, edge 150 is illustrated in FIG. 1B connected to nodes $X_i$ and $Y_j$. Any possible assignment of labels to the random variables will be called a labeling (denoted by x) which takes values from the set L=L$^n$. The most probable or maximum a posterior (MAP) labeling x* of the random field can be computed by maximizing the posterior or alternatively minimizing the energy of the random field as:

$$x^{opt} = \underset{x \in L}{\operatorname{argmax}} Pr(x \mid D) = \underset{x \in L}{\operatorname{argmin}} E(x) \qquad (1)$$

Where D is the image data and E(x) is the energy function of the image 106.

Also, the random field models used for most vision problems are pairwise, i.e. their energy function E:L$^n$→R can be written as a sum of unary and pairwise functions.

$$E(x) = \sum_{i \in V} \varphi_i(x_i) + \sum_{(i,j) \in \varepsilon} \varphi_{ij}(x_i, x_j). \qquad (2)$$

For image labeling problems, the set V corresponds to the set of image pixels, $\epsilon$ is set of all edges between pixels un a 4 or 8 neighborhood, and the random variable Xi denotes the labelling of pixel i of the image. Every possible assignment of the random variables x is called the labeling or configuration of the random field. The energy function table 148 represents the unary potential portion of equation (2) and that the edge energy function table 152 is based on the pairwise functions noted equation (2). As noted in table 152, the energy function of edge 150 is based on the pairwise combination of the energy functions of nodes $X_i$ and $Y_j$.

Example Methods

Figure 2:
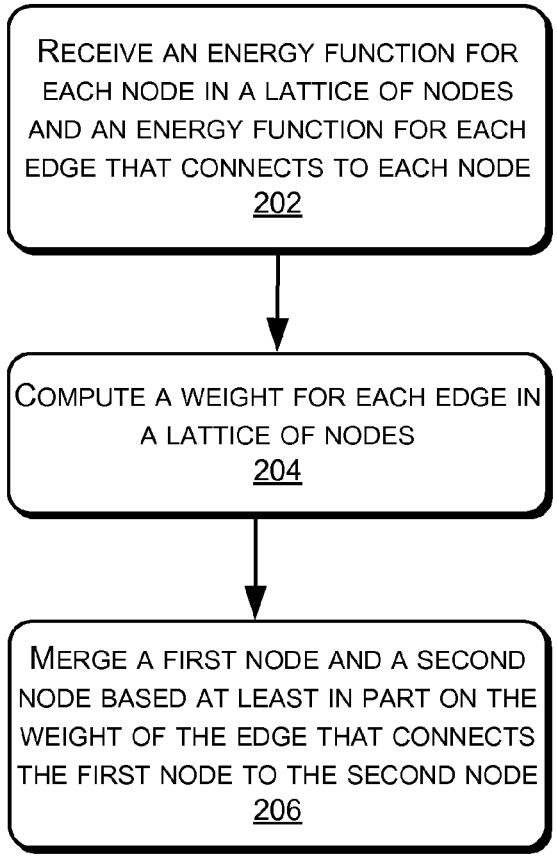
FIG. 2 illustrates another example method that merges the nodes of the lattice to form a smaller dataset for analysis.

FIG. 2 is a diagram of method 200 for merging nodes within the lattice 108. At block 202, the grouping module 130 receives the energy functions for each node in a lattice of nodes and an energy function for each of the edges that connect the nodes together. The energy functions of the nodes represented by the unary potentials of equation (2) and the energy functions represented by the pairwise function of equation (2).

At block 204, a weight for each edge is calculated by the grouping module 130. The weight function of each edge may be based on a unary-only function or a combination of a unary function and a pairwise function. As will be shown below, the weights of the edges consider all states of the node equally important.

In one instance, the unary-only function may be based on an absolute maximum difference in energy between the first node and the second node, as represented in equation (3).

$$w_{ij} = \|\phi_i - \phi_j\| \quad (3)$$

Hence, the weight for edge$_{ij}$ ($w_{ij}$) is the absolute difference between the energy functions of node i and node j and is referred to as the Unary Difference weight.

In another instance, the weight function may based on the preferred states of each node, instead of all states for each node. For example, the weights can be defined as the amount of disagreement between the preferences. For example, if we take the label or preference of node i with the lowest energy function, such that $l_i = \text{argmin}_l \phi(l)$, and likewise take the label or preference with the lowest energy function, such that $lf = \text{argmin}_l \phi(l)$. The weight equation based on disagreement between the preferences may be calculated via equation (4). Where $\phi_i(l_i)$ and $\phi_j(l_j)$ denote the preferred states of the node.

$$w_{ij} = \max(\phi_i(l_j) - \phi_i(l_i), \phi_j(l_i) - \phi_j(l_j)) \quad (4)$$

The unary-only weighting functions above in equations (3) and (4) ignore the influence of the pairwise potential $\phi_{ij}$. This is justified in the energy minimization problems where the unary potentials are indicative of the true label. However, in certain instances the pairwise term is important and including it in the weight function accounts for its influence. In that instance when the pairwise influence is desired, the weighting function is based on the difference of the mean energy of the agreeing labels ($l_i = l_j$) versus the difference of the mean energy of the disagreeing labels ($l_i \neq l_j$). For example, the labels agree when both nodes i and j have the same label (e.g., person/person) and disagree when node i and j have different labels (person/ground). Equation (5) illustrates a weight function that incorporates the unary and pairwise components in determining the difference between nodes that have agreeing labels and nodes that have disagreeing labels.

$$w_{ij} = \frac{1}{k} \sum_{l_i = l_j} (\varphi_i(l_i) + \varphi_j(l_j) + \varphi_{ij}(l_i, l_j)) - \\ \frac{1}{k^2 - k} \sum_{l_i \neq l_j} (\varphi_i(l_i) + \varphi_j(l_j) + \varphi_{ij}(l_i, l_j)) \quad (5)$$

The agreeing label component ($l_i = l_j$) described above is represented in the first summation component of equation (5) and the disagreeing label component ($l_i \neq l_j$) is represented in the second summation component of equation (5). Each label component includes a unary component for a node i (e.g., $\phi_i(l_i)$) and a node j (e.g., $\phi_j(l_j)$) and a pairwise component (e.g., $\phi_{ij}(l_i, l_j)$). The summation components are also modified by a k factor or a normalizing factor, with k representing the amount of possibilities in which the nodes i and j can agree. For example, in table 146, each of the three nodes ($X_1, Y_1, Z_1$) have three states in which the nodes may agree, each node has a preference for x (person), y (liquid), or z (ground) therefore k is three. However, if one node did not have a z (ground) preference, and then when that two preference node is analyzed against a node that had three preferences, then k would be two, since there are only two possibilities in which the nodes may agree. Equation (5) provides two instances of how the k factor maybe employed. In a first instance, the reciprocal of k is employed against the agreeing label component. In a second instance, the reciprocal of $k^2-k$ is employed against the disagreeing label component.

Each of the weight functions described above in equations (3)-(5) may be employed to determine how nodes may be merged under method 200. The different weight functions may be used based on a trade off between run-time and accuracy. In some instances accuracy may not be as important as run-time. Hence, the unary weight functions (i.e., equations (3) and (4)) may be sufficient to obtain acceptable results. In the alternative, when accuracy is more important than run-time considerations then incorporation of pairwise components (i.e., equation (5)) may be utilized. In some instances, portions of an image may require a less accurate analysis while other portions of the image may require a higher level of accuracy, therefore the analysis may incorporate different weighting functions for difference portions of an image.

At block 206, merging a first node and a second node into a group node based at least in part on the weight of the edge that connects the first node to the second node. In one instance, in lattice 140, the first node being $X_i$ and the second node being $Y_j$ and are connected by edge 150. The two nodes may be merged into a group (e.g., person, liquid, or ground) if the weight function of edge 150 is less than or equal to a determined value of the internal differences of each group (e.g., person, liquid, ground). For example, the weight of edge 150 that links $X_i$ and $Y_j$ is compared against the internal differences of each preferred group for each node (e.g., person, liquid, or ground). If the weight of the edge is less than or equal to the internal differences of at least one of the two groups, then the two nodes may be combined into that group. If the weight of the edge is less than or equal to the internal difference of more than one variable group, then the nodes are merged into the variable group that has the greatest difference between the weight function and the internal difference of the variable group. In other words, they nodes are merged into the variable group that has the highest absolute difference between the weight function and the internal difference. The block described above is repeated for each edge in the lattice 108 such that a new lattice 110 is formed based on the combination of nodes into larger groups of nodes (e.g., 116A-C).

Measuring the internal difference within the groups may be measured in a variety of ways known in the art. For example, the internal difference may be determined by the internal difference function described in "Efficient graph based image segmentation" by Felzenswalb & Huttenlocher. *Efficient graph based image segmentation*, Int'l Journal of Computer Vision, 592(2):167-181, 2004.

Example Variable Groupings of an Image

FIGS. 3A-3E are schematic diagrams illustrating how variables are grouped based on the image analysis techniques that may be applied to the image. A wide variety of image analysis techniques may incorporate the method 102 or 200 to reduce the cost or amount of time for image analysis. Such techniques may include image segmentation, object segmentation, geometric labeling, depth estimation, and three dimensional reconstruction and any other image analysis techniques known in the art of computer vision.

Figure 3A:
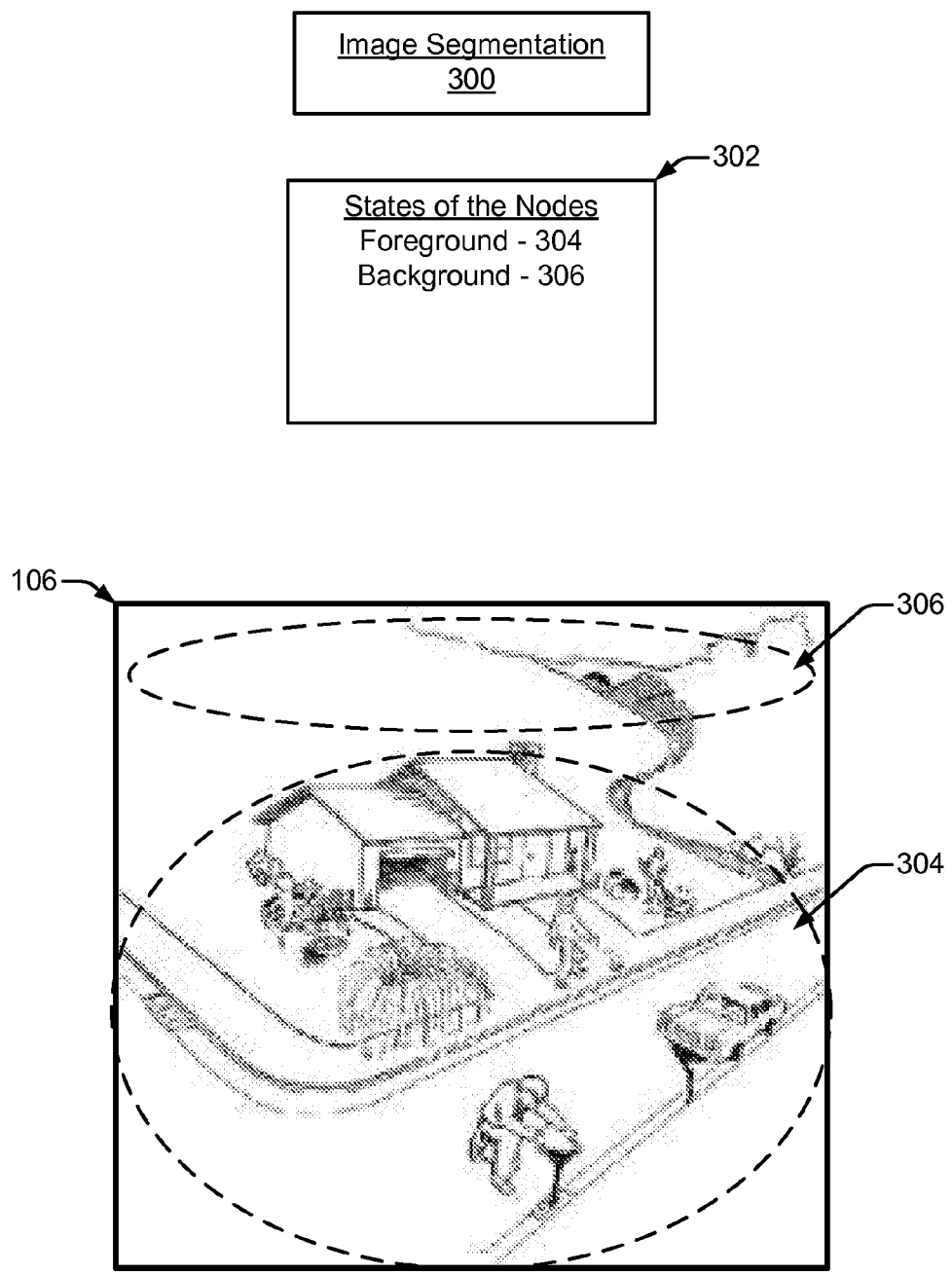
FIGS. 3A-3E illustrates example applications of the methods described below to using a variety of image analysis techniques.

FIG. 3A is an illustration of an image 106 that will be analyzed using image segmentation 300 techniques and a state table 302 that lists the possible states used during the image analysis. Image segmentation is an analysis technique that distinguishes objects from the background of the image. For example, table 302 lists the possible states of the nodes that may form a lattice 108 that is representative of image 106. In this instance, the nodes are labeled as foreground 304 or background 306. As illustrated in FIG. 3A, the foreground nodes may include the pixels that are used to form the house, car, people, plants, sidewalks, or roads shown in image 106. The background nodes may include the pixels that that include objects that are located behind foreground images. In FIG. 3A, the designation of foreground and background is arbitrary and may be designated by the administrator of the intent module that directing the image analysis. Hence, the person kneeling in image 106 may be considered the foreground and the house may be considered the background in some instances. The designation of foreground and background in FIG. 3A is intended to provide high level explanation of the state assignments for the nodes that are formed into a lattice 108 and should not be construed to limit the definition of the foreground or the background in an image. In this example, the two preferences of each node and their respective energy functions are provided to the grouping module 130 and the nodes are merged into groups according to the method 102 or 200 described above.

Figure 3B:
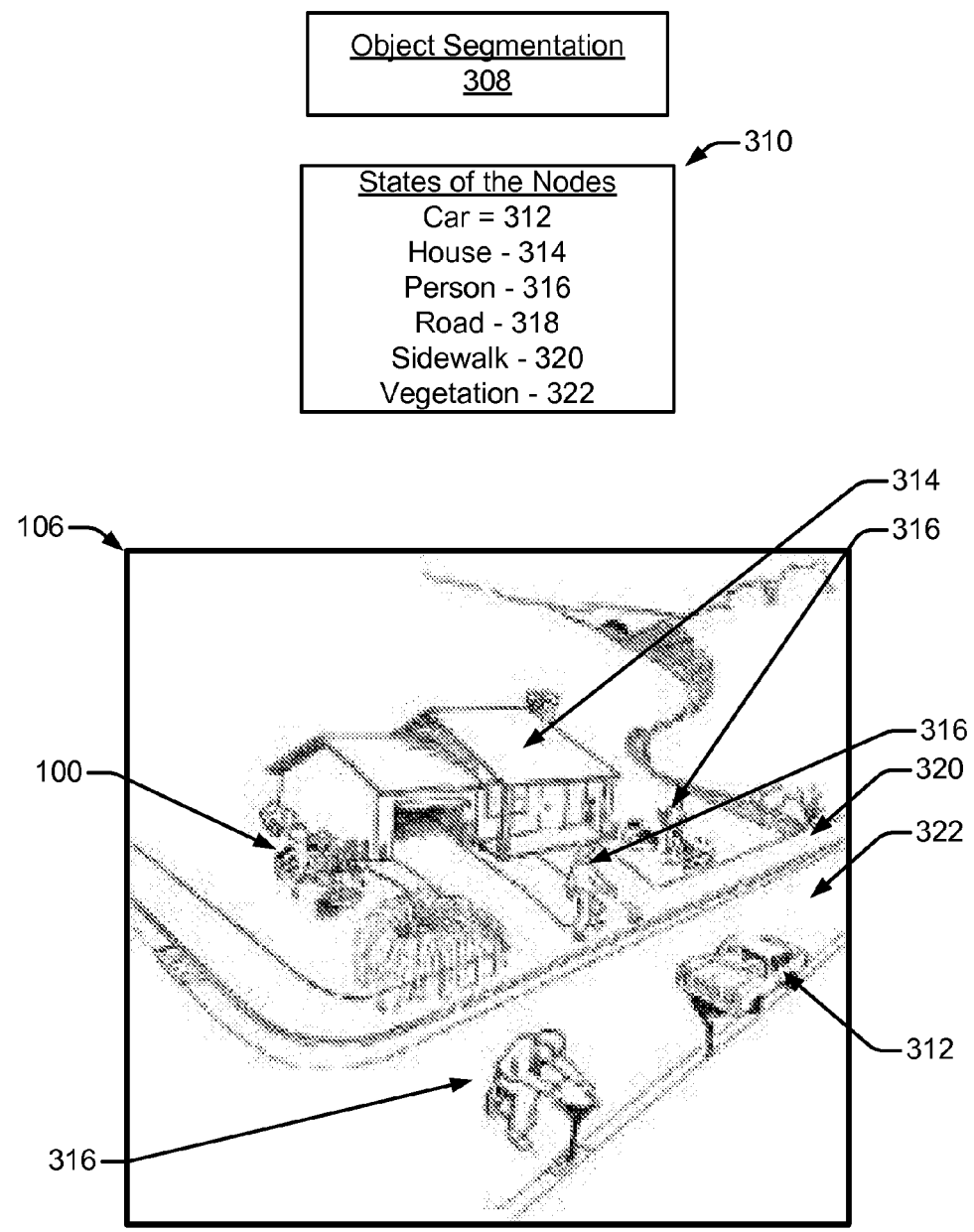

FIG. 3B is an illustration of an image 106 being analyzed using object segmentation 308 techniques. Object segmentation may involve determining which pixels belong to an object in image 106. For example, state table 310 lists a few possible states for the nodes that may be provided to the grouping module 130 for analysis. In this instance, the objects in the image 106 are a car 312, a house 314, a person 316, a road 318, a sidewalk 320, and vegetation 322. For ease of explanation, not all objects in image 106 are provided for in the states above. The states of table 310 are merely intended as representative of some of the key features in image 106. In another instance, many more states may exist than the ones described above for image 106. For example, additional states could be created to represent the three people individually in the image instead of using a single state (person 316) each person.

As noted above, the nodes and edges are provided to the grouping module 130 with their respective energy functions. As similarly noted in the preference table 146, each node may have a preferred state/label but they may also have preferences for other states/labels. As such, the energy function associated with each node reflects the various preferences in total, as similarly described in energy table 148. Likewise, as shown in table 152, each edge includes an energy function that is based in part on the energy functions of the nodes that are coupled to the edge. Accordingly, after receiving the information above, the grouping module 130 performs the methods 102 or 200 to group or merge the nodes and edges from a large problem 108 to a smaller problem 110.

Figure 3C:
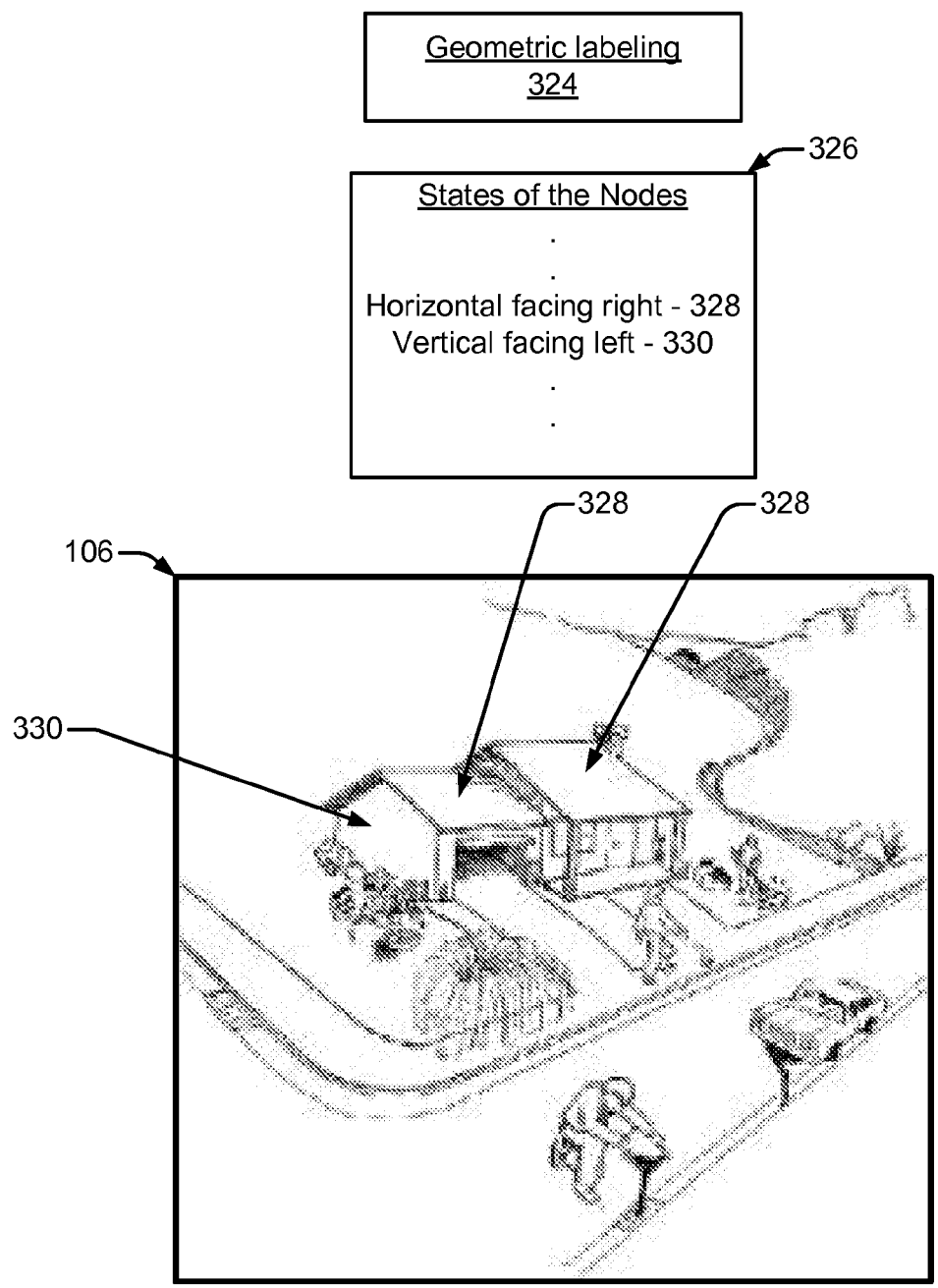

FIG. 3C is an illustration of an image 106 that may be analyzed using geometric labeling 324 techniques. At a high level, geometric labeling involves identifying geometric shapes and/or their orientation as presented in an image. For example, image pixels may be divided into groups based on how likely an object in image 106 is representative of a geometric feature. For the purpose of ease of explanation, only two geometric states/labels are included in the geometric state table 326. In this instance, the states include a horizontal facing right state 328 and vertical facing left state 330 that are applied to the house in image 106. Again, the states and energy functions associated with the labeled geometric objects are provided to the grouping module 130 for analysis using method 102 or 200 as described above.

Figure 3D:
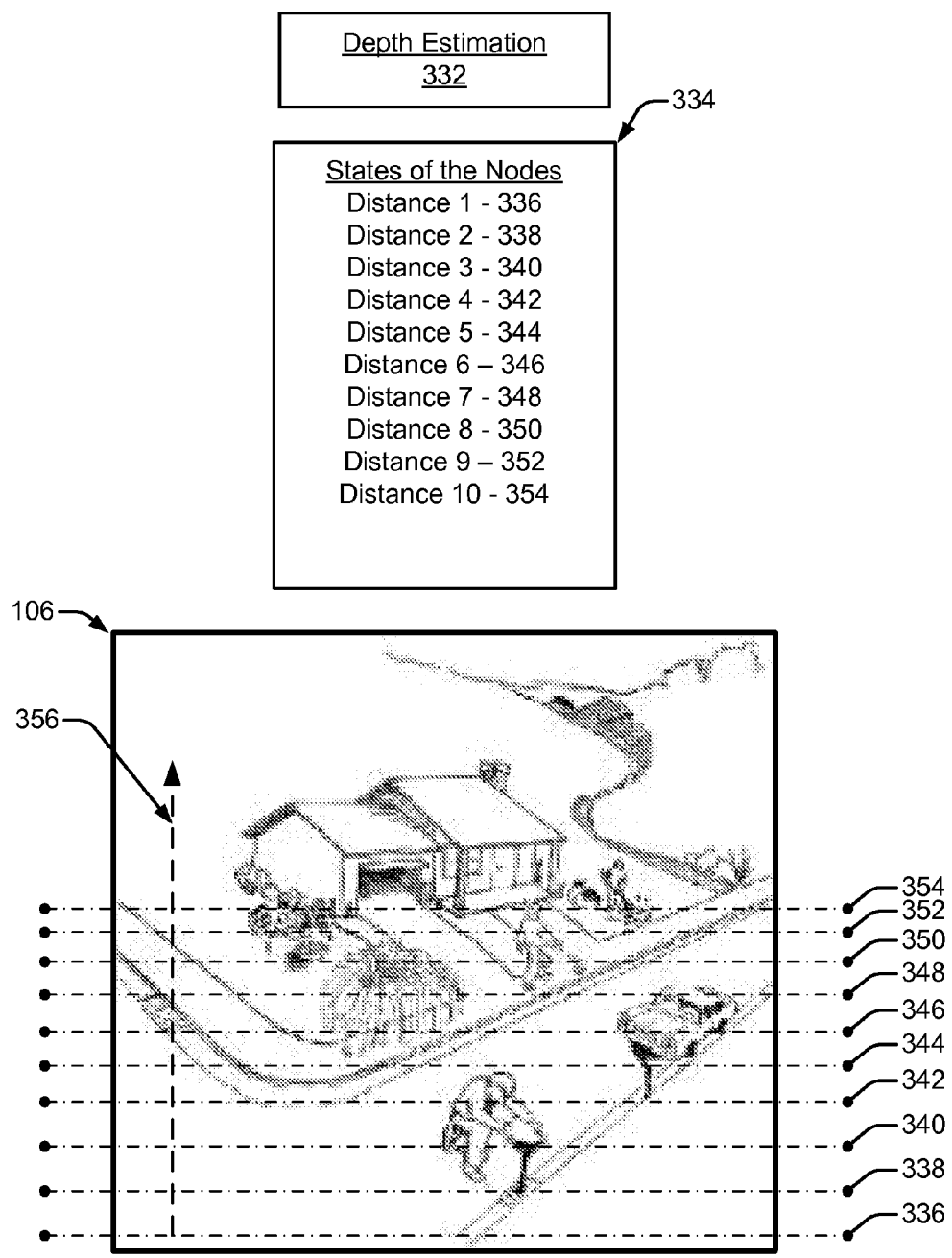

FIG. 3D is an illustration of an image 106 that may be analyzed using depth estimation 332 techniques. Depth estimation involves identifying the depth of an object relative to other objects presented in an image. For example, pixels may be divided into groups based on how likely they represent a similar or same depth of an object in an image 106. As shown in the depth estimation state table 334, the states/labels are representative of a distance portrayed in the image 106. In FIG. 3D, the varying depths or distances are depicted by states 338-354 are arbitrary and are provided here as an example. Dashed line 356 is intended to reflect the increasing depth distance into the image 106. For example, distance 1 336 represents the smallest depth estimate in the image 106 and distance 354 represents the largest depth estimate for image 106. The decreasing distance between the lines 336 and 354 is also an indication that the lines are reflecting deeper depths from depth line 336 to depth line 354. The distance lines 336-354 are not intended to reflect the literal distances, but instead represent that depth or distance of objects in the image 106. For example, distance lines 340-342 all intersect with the kneeling person in the foreground of the image. However, the kneeling person does not have three depth states. The pixels associated with the kneeling person will have one depth estimate (e.g., 340), but the pixels to the left and right of the kneeling person that are associated with the street behind the person will have another depth estimate (e.g., 342). Again, the node information pertaining to the node states, depth estimates in this instance, and the corresponding energy function for each node and edge are provided to the grouping module 130 for analysis using the method 102 or 200 as described above.

Figure 3E:
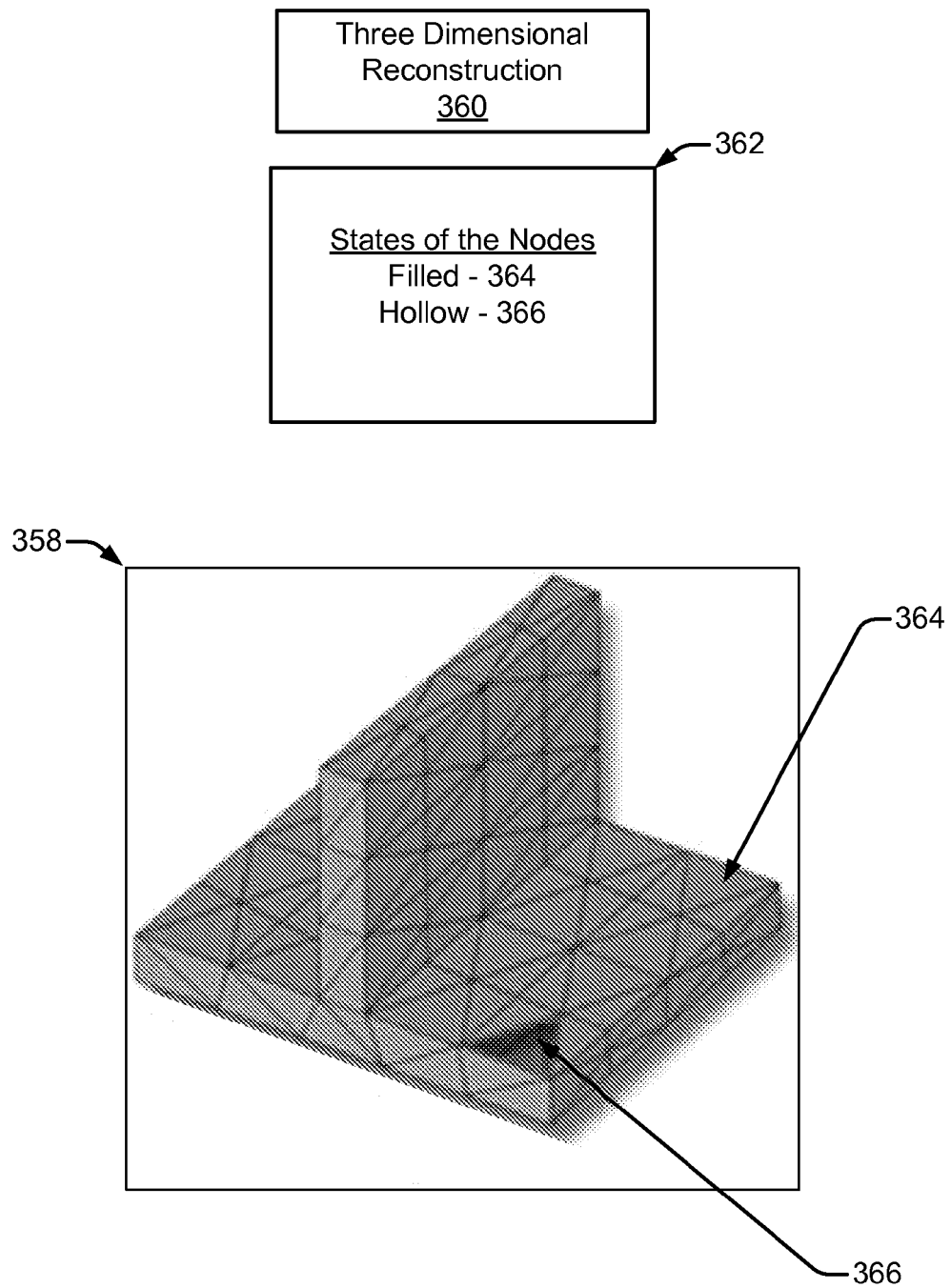

FIG. 3E is an illustration of a three-dimensional reconstruction of perpendicular bracket object 358 formed by a plurality of triangular volume elements. Three-dimensional reconstruction 360 techniques may be used to model any type of object by arranging volume elements together to form an image. In this instance, the volume element state table describes the possible states as being filled 364 or hollow 366. As shown in FIG. 3E, the nodes for the triangular elements may as filled 364 or hollow as shown in three-dimensional bracket 358. Again, the node information pertaining to the node states, filled or hollow in this instance, and the corresponding energy function for each node are provided to the grouping module 130 for analysis using the method 102 or 200 as described above.

CONCLUSION

Although the embodiments have been described in language specific to structural features and/or methodological acts, is the claims are not necessarily limited to the specific features or acts described. Rather, the specific features and acts are disclosed as illustrative forms of implementing the subject matter described in the disclosure.

What is claimed is:
1. A device comprising:
one or more processors; and
memory to maintain a plurality of components executable by the one or more processors, the plurality of components comprising:
a collection component that receives a plurality of nodes and a plurality of edges that are representative of a large problem, an individual node of the plurality of nodes being interconnected to another node of the plurality of nodes by one or more edges of the plurality of edges, the individual node being in two or more states, a state component that receives estimates of a plurality of states for the individual node and an energy function for the individual node, the energy function for the individual node being determined based in part on the two or more states of the individual node that is connected by one or more edges, a merging component that merges two or more nodes of the plurality of nodes to form at least one merged node based in part on an energy function of at least one edge interconnecting two nodes of the two or more nodes, the at least one merged node being interconnected to another merged node by at least one merged edge to form a smaller problem that is representative of the large problem, the smaller problem including an amount of merged nodes that is smaller than an amount of nodes of the large problem, and a solution component that determines, based in part on merged nodes and merged edges, a solution that minimizes an energy function of the smaller problem, the solution being used to determine a solution that minimizes an energy function of the large problem.

2. The device of claim 1, wherein the merging is implemented further based in part on a weight of an edge connecting a first node and a second node of the two or more nodes.

3. The device of claim 2, wherein the weight is determined based in part on an energy function of the edge.

4. The device of claim 2, wherein the weight is determined based at least in part on a difference between a mean energy of nodes within a first set of states and a mean energy of nodes in a second set of states.

5. The device of claim 2, wherein the weight is determined based at least in part on a maximum difference in energy between the first node and the second node.

6. The device of claim 2, wherein the weight is determined based at least in part on an absolute difference between an energy potential of the first node and an energy potential of the second node.

7. The device of clam 1, wherein the node comprises a pixel of an image.

8. The device of claim 1, wherein the node comprises a volume element of a three dimensional image.

9. One or more computer-readable storage media storing instructions that, when executed by one or more processors, configure the one or more processors to perform acts comprising:

receiving a plurality of nodes and a plurality of edges for a large problem, an individual node of the plurality of nodes being connected to another node of the plurality of nodes by at least one edge of the plurality of edges, the individual node comprising an energy function and an individual edge of the plurality of edges comprising a certain energy function that is determined based at least in part on energy functions of nodes connected by the individual edge; and grouping the plurality of nodes into a plurality of merged nodes by merging an individual node of the plurality of nodes with another node of the plurality of nodes based in part on an energy function of a certain edge connecting the individual node and the other node and on energy functions of the individual node and the other node, the plurality of merged nodes being interconnected by merged edges to form a smaller problem that is representative of the large problem.

10. The one or more computer-readable storage media of claim 9, wherein the individual node comprises two or more states, and the energy function for the individual node is representative of the one or more states for the individual node.

11. The one or more computer-readable storage media of claim 10, wherein the states comprise a foreground for an image and a background for the image.

12. The one or more computer-readable storage media of claim 10, wherein the states comprise a first pixel depth for an image and a second pixel depth for the image.

13. The one or more computer-readable storage media of claim 10, wherein the states comprise a filled state for a volume element of a three dimensional image and a hollow state for the volume element of the three dimensional image.

14. The one or more computer-readable storage media of claim 10, wherein the states comprise a first object for an image and a second object for the image.

15. The one or more computer-readable storage media of claim 10, wherein the states comprise a first type of surface for an image and a second type of surface for the image.

16. A method comprising:

receiving an energy function for each node in a lattice including multiple nodes and multiple edges, each node being connected to at least one other node by one edge;

storing the energy functions in memory;

receiving an energy function for each edge in the lattice, the energy function for each edge being determined based in part on energy functions of the multiple nodes that are coupled to the multiple edges;

computing, using a processor, a weight for each edge of the multiple edges in the lattice; and merging a first node of the multiple nodes and a second node of the multiple nodes based at least in part on a weight of an edge that connects the first node to the second node.

17. The method of claim 16, wherein the weight is determined based at least in part on a difference between a mean energy of the nodes within a first set of states and a mean energy of the nodes in a second set of states.

18. The method of claim 16, wherein the weight is determined based at least in part on a maximum difference in energy between the first node and the second node.

19. The method of claim 16, wherein the weight is determined based at least in part on an absolute difference between an energy potential of the first node and an energy potential of the second node.

* * * * *